UNITED STATES PATENT OFFICE.

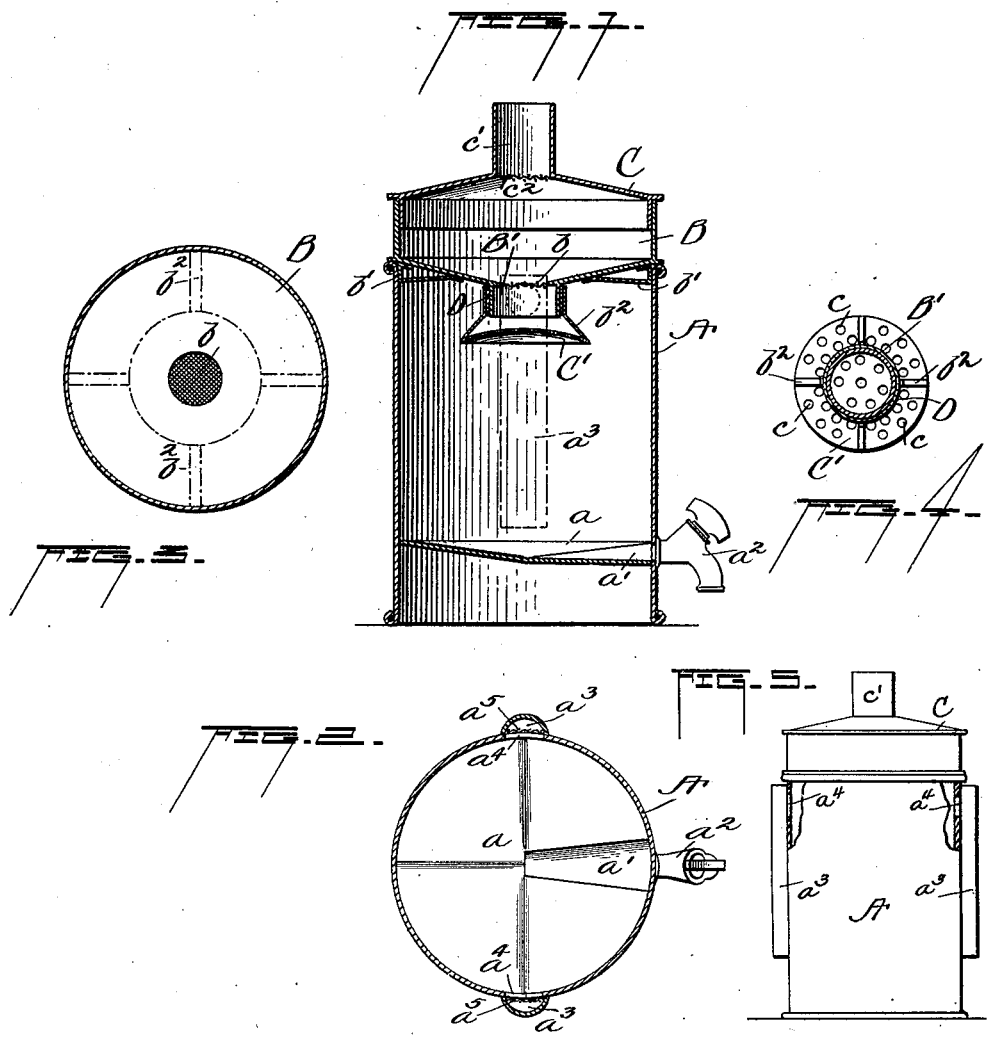

EDWARD H. PIFER AND BENJAMIN F. HOUSE, OF EUREKA, ILLINOIS.

CREAM-SEPARATOR.

SPECIFICATION forming part of Letters Patent No. 658,923, dated October 2, 1900.

Application filed April 11, 1900. Serial No. 12,416. (No model.)

*To all whom it may concern:*

Be it known that we, EDWARD H. PIFER and BENJAMIN F. HOUSE, citizens of the United States, residing at Eureka, in the county of Woodford and State of Illinois, have invented certain new and useful Improvements in Cream-Separators; and we do hereby declare that the following is a full, clear, and exact description of the invention, which will enable others skilled in the art to which it appertains to make and use the same.

Our invention relates to cream-separators, having particular reference to the construction and arrangement of the receptacle and component parts, substantially as hereinafter more fully disclosed, and specifically pointed out by the claim.

Our object is to produce a cream-separator which is cheap and durable in its construction, of great utility, and effective in its operation, and at the same time separates the cream from the milk in the shortest time possible.

In following out the invention hereinafter more particularly described in detail we have endeavored to overcome the many objections to this class of device and have constructed a separator which is very simple and perfect in operation, the object being to provide a separator having a perfect circulation of air into the same which will completely carry off the odors incident to such separation, which are naturally introduced in the receptacle from various sources, such as the animal smell and the heat arising from the milk, and to further provide the introduction of the milk to the separator so as to distribute evenly within the receptacle, and to further prevent any eddying within the same as the water and milk or cream is drawing therefrom, and, further, in the provision of such other details which enter into the perfect operation of the device hereinafter more particularly described in detail and claimed in the appended claim.

That our invention may be more fully understood reference is had to the accompanying drawings, in which—

Figure 1 is a vertical cross-section of our new and improved cream-separator. Fig. 2 is a horizontal cross-section through the line of the air-inlet openings in the receptacle. Fig. 3 is a cross-section showing certain parts in detail. Fig. 4 is a cross-section through the annular ring, showing the spreader in plan. Fig. 5 is an elevation of the receptacle, a portion of the same being broken away to show the air-inlet openings therein.

In the drawings like letters of reference indicate the several corresponding parts of the figures.

A refers generally to the main body of the receptacle, which in this instance is shown circular in form and is provided with the faucet $a^2$, attached to the same at a suitable point on the body thereof.

$a$ is a conical-shaped bottom of the receptacle raised somewhat from the bottom of the same, the point of such cone depending within the receptacle, and at $a'$ is a gutter or conduit extending from the central point thereof to the side of the receptacle and converges, so as to be wider at the outer portion, and is arranged to communicate with the faucet of said receptacle.

C refers to a cover or lid for the receptacle A and is provided with the short tubular extension $c'$ and the sieve $c^2$.

B is an intermediate supplemental lid or receptacle for the spreader and is provided with a conical-shaped bottom, having depending therefrom the short tubular extension B' and the sieve $b$, covering the opening to the extension B', as shown. The bottom is provided with a series of cleats $b'$, suitably attached thereto, which when the receptacle B is attached to the receptacle A is carried adjacent to the inner wall of the bottom portion A, as shown, arranged to retain the same in proper relation thereto.

D is an annular ring suitably carried by the tubular extension B' and has the straps or frame-pieces $b^2$ depending therefrom, which support a spreader C', which is provided with suitable perforations, as shown.

We have shown attached to the receptacle A, on the outside thereof, suitable air-ducts $a^3$, arranged opposite to each other, being open at the bottom and closed at the top, and $a^4$ are air-inlet openings in the body of the receptacle A at a suitable point near the top of the air-ducts $a^3$, and $a^5$ are suitable screens covering the openings $a^4$, as shown.

In the construction of the separator, if desired, the covering C therefore may be dispensed with entirely, and the lid or supplemental receptacle B, after the milk has been introduced into the separator, may be so arranged as to be inverted and used as a lid for the same.

The operation of the device may be explained as follows: The receptacle being ready for the introduction of water thereto, the lid C is inverted and attached to the receptacle A and water poured into the receptacle, so as to pass through the strainer $c^2$, which will retard the heavier particles from entering the same, and after such operation the same is removed and the receptacle B is placed in its position substantially as is shown in Fig. 1, and the milk is introduced to the receptacle A, passing through the strainer $b$, and being distributed evenly therein by reason of the same passing over and through the spreader C' the separation of the cream will begin to take place. The operation and action of the same being well understood by those versed in the art of cream separation need not here be given in detail. After the milk has been introduced to the separator the lid C is secured in place, as is shown in Fig. 1, which, together with the receptacle B, forms an air-chamber in the upper portion of the receptacle, and the air which will necessarily pass through the ducts $a^3$ will pass from the main receptacle A and carry with it the odors arising from the milk through the tubular extension B' and out through the tubular extension c' of the lid C.

The provision of a bottom such as we have shown is to provide against any eddying that may take place when the liquid is being drawn from the separator. This we accomplish by providing a gutter or conduit substantially as shown which will allow the same to pass from the separator very easily and quietly, and the arrangement is such as to cause every bit of liquid to pass from the receptacle A.

Having thus fully described our invention, what we claim, and desire to secure by Letters Patent of the United States, is—

A cream-separator comprising the cylindrical body A, having a bottom substantially conical in shape provided with a trough or conduit extending from the center to one side, a faucet communicating with the trough, air-ducts oppositely arranged on the separator extending from a point near the bottom to a point just below the top and open at the bottom and closed at the top, air-inlet openings in the receptacle for the admission of air from the air-ducts and covered with suitable gauze material, the arrangement and combination of parts substantially as herein shown and described.

In testimony whereof we affix our signatures in presence of two witnesses.

EDWARD H. PIFER.
BENJAMIN F. HOUSE.

Witnesses:
  A. V. FRAME,
  D. M. RALSTON.